United States Patent
Tanghetti

(10) Patent No.: US 7,900,889 B2
(45) Date of Patent: Mar. 8, 2011

(54) VALVE-ACTUATOR CONNECTION PLATE

(75) Inventor: Ermanno Tanghetti, Bovezzo (IT)

(73) Assignee: EFFEBI S.p.A., Bovezzo (IT)

( * ) Notice: Subject to any disclaimer, the term of this patent is extended or adjusted under 35 U.S.C. 154(b) by 898 days.

(21) Appl. No.: 11/408,168

(22) Filed: Apr. 21, 2006

(65) Prior Publication Data
US 2006/0237679 A1    Oct. 26, 2006

(30) Foreign Application Priority Data

Apr. 22, 2005   (IT) .............................. MI2005A0739

(51) Int. Cl.
*F16K 31/60* (2006.01)

(52) U.S. Cl. ......................................... 251/287; 251/292

(58) Field of Classification Search .................. 251/284, 251/286, 287, 288, 291, 292
See application file for complete search history.

(56) References Cited

U.S. PATENT DOCUMENTS

| | | | |
|---|---|---|---|
| 5,010,917 A * | 4/1991 | Iqbal | 137/454.6 |
| 6,019,129 A * | 2/2000 | Taha | 137/553 |
| 6,073,907 A * | 6/2000 | Schreiner et al. | 251/129.12 |
| 6,125,511 A | 10/2000 | Woods | |
| 6,206,337 B1* | 3/2001 | Veillet, Jr. | 251/67 |
| 6,640,390 B1 | 11/2003 | Lai | |
| 6,684,901 B1* | 2/2004 | Cahill et al. | 137/315.03 |
| 6,748,967 B1 | 6/2004 | Smiltneek | |
| 6,880,806 B2* | 4/2005 | Haikawa et al. | 251/292 |
| 7,131,635 B2* | 11/2006 | Oh | 251/292 |
| 2004/0099833 A1* | 5/2004 | Haikawa et al. | 251/292 |
| 2004/0222396 A1 | 11/2004 | Miklo et al. | |

* cited by examiner

*Primary Examiner* — John Bastianelli
(74) *Attorney, Agent, or Firm* — Nixon & Vanderhye P.C.

(57) ABSTRACT

The invention relates to a connection plate between the body of a valve for hydraulic or pneumatic circuits and an actuator suitable to control the rotation of the valve stem, the valve body being provided with pawls for the stem rotations. This plate comprises a shaped body that can be inserted on the valve body and has an opening for the valve stem, said shaped body defining passageways for the pawls and adjacent seats where the pawls are housed and held following a rotation of the plate upon assembly. This allows connecting conventional types of valves and actuators to each other.

7 Claims, 3 Drawing Sheets

VALVE-ACTUATOR CONNECTION PLATE

BACKGROUND AND SUMMARY OF THE INVENTION

The present invention relates to a plate by means of which a valve, particularly a standard valve for hydraulic or pneumatic circuits, can be connected to a relative actuator which also may be of a standard type.

In the current technique, the connection between a valve and an actuator generally implies providing a special valve body, which carries as one piece a plate or terminal block intended to be mechanically connected to the actuator. Furthermore, it is also known to provide plates or terminal blocks that can be applied to the valve body upon assembly, but also in this case the valve body has to be designed and constructed in a special manner.

In view of the above, the object of the present invention is to provide and propose a plate or terminal block by means of which an originally hand-operated valve, particularly of a standard type, can be easily and quickly connected to an actuator for the remote control of the valve. By the term "standard type of valve" is meant herein a fluid flow control valve with a control stem having several feasible shapes, a hand-operated control lever being removably mounted thereto.

The lever is usually mounted to a boot surrounding the valve body adjacent to the control stem and which is suitable to interfere by means of pawls, generally one or two counter-posed pawls, positioned on the valve body to define the range of the lever movement.

According to the invention, it is now possible that, after the hand-operated control lever has been removed and the stem shape has been checked, an actuator is applied to a valve, particularly a standard valve, by interposing a connection plate as defined in the claims, and particularly in claim 1.

BRIEF DESCRIPTION OF DRAWINGS

The plate according to the invention will be now described with reference to the annexed drawings, in which.

DETAILED DESCRIPTION OF ILLUSTRATED EMBODIMENTS

Figure 1:
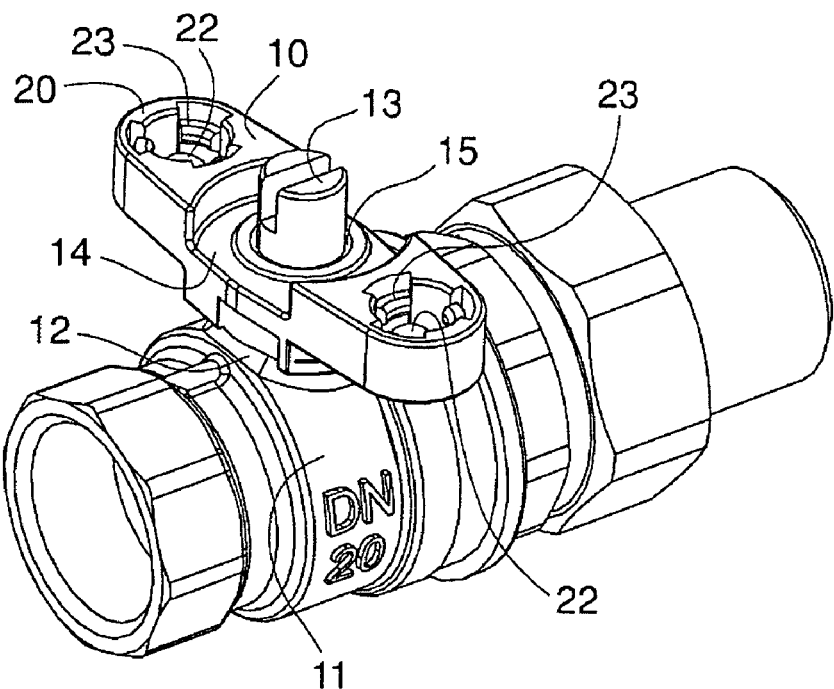
FIG. 1 is a top perspective view of an exemplary embodiment of a connection plate according to the invention when applied to a valve.

With reference to the figures and first to FIG. 1, the plate 10 according to the invention is illustrated as being mounted to the body of a standard type of valve 11, the control lever thereof has been removed after the stem has been checked, in order to fit the plate 10 and then an actuator (not shown). Externally to the flanks of the housing 12 of the control stem 13, which may have various shapes, the valve body 11, as it is known, has two pawls (12' in FIG. 2) which have the function of restraining the stroke of the hand-operated control lever.

Figure 2:
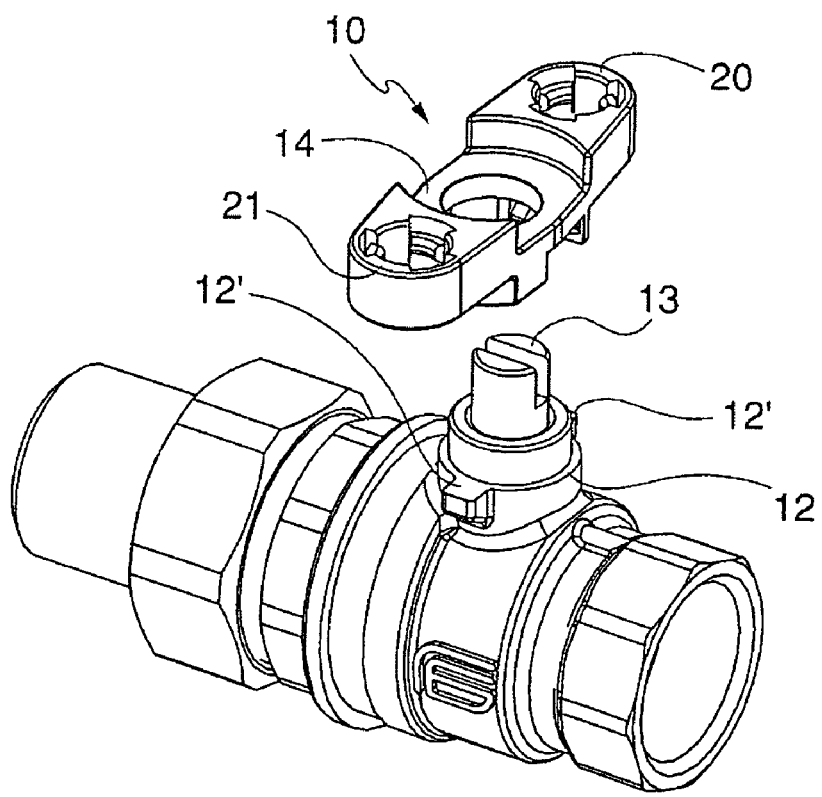
FIG. 2 is a perspective view of the same plate while being mounted to a valve.
Figure 3:
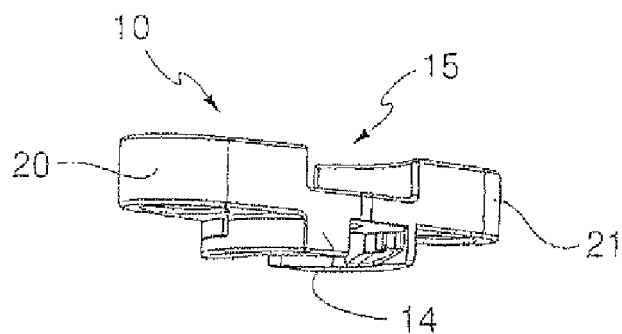
FIG. 3 is a side perspective view of the plate only.
Figure 4:
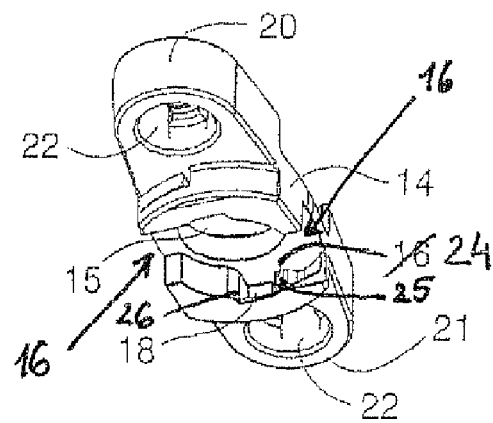
FIG. 4 is another bottom perspective view of the plate only.

The plate 10, whose construction features are also seen in FIGS. 2-4, is preferably made of plastic material and has a main body 14 which is sized and configured such as be fitted to the outside of the housing 12, with a central opening 15 allowing the control stem 13 to pass therethrough.

Figure 5:
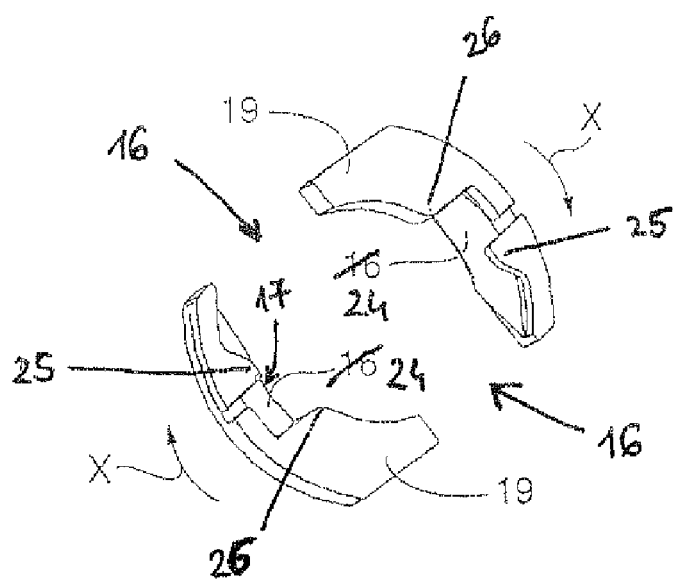
FIG. 5 is a detailed perspective view, showing details of the plate area intended to be connected to the valve pawls.
Figure 6:
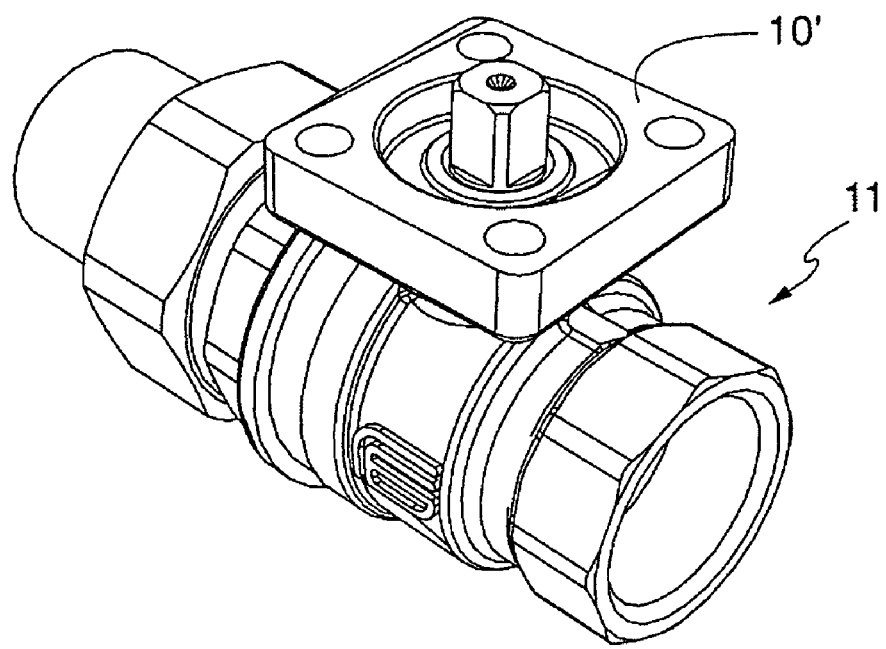
FIG. 6 illustrates a valve 11 with a plate 10' of a traditional type being applied thereto.
Figure 7:
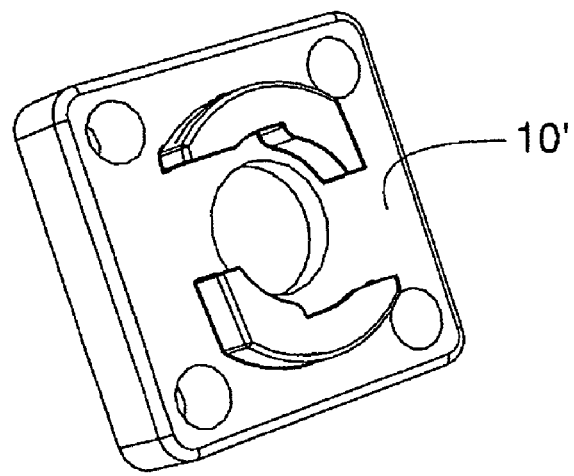
FIG. 7 illustrates only the plate 10' as seen from below.

To mount the plate 10 to the valve body and lock the latter in position, the main body 14 of the plate is configured, laterally to the central opening 15, such as illustrated in FIG. 5, where this configuration is seen from below with limitation to the details of interest.

Particularly, the body 14 has two openings or prompts 16 on the bottom thereof, where the two counter-posed arranged pawls protruding from the valve body are inserted when the plate is being assembled. At this point, when the plate is rotated in the direction as indicated by the arrows X, it shifts relative to the pawls and cause them to be housed in seats 17, where these pawls are held by the upper 18 and lower walls 19 and 24 of the seats and by holding means consisting of reliefs 25 and 26 snap-acting on the pawls of the valve body to prevent that the valve and the plate may mutually move in the direction parallel to the valve stem. Furthermore, when the pawls are introduced in the seats 17, a snap stop is surpassed, thus the pawls are locked in the seats such that any rotation in a direction opposite to X is prevented.

The plate can be either a part of the actuator or be fixed to the latter before it is mounted to the valve.

Alternatively, the plate 10 can be mounted to the valve 11 and then the plate can be connected to the actuator.

The latter connection can be carried out by means of one of the traditional modes, by using tongues, such as 20 and 21 being provided in the plate as illustrated herein.

In the case illustrated, the tongues are provided with actuator fastening means, such as openings 22 with snap-acting means, such as pawls 23 (FIG. 1), the heads of two projecting pins carried by the actuator being capable of engaging therebelow.

The invention claimed is:

1. A one-piece connection plate between a body of a valve for hydraulic or pneumatic circuits and an actuator suitable to control rotation of a valve stem, the valve body being provided with pawls, said connection plate including a shaped body that can be inserted on the valve body and has an opening for the valve stem, said shaped body including openings for receiving the pawls of the valve body, and, in a common plane with the openings, internal passageways and adjacent housing and holding seats, wherein the pawls are housed and held by reliefs following a rotation by the plate upon assembly, wherein the reliefs are structured to counteract rotation of the plate and the valve body in the direction opposite to the assembly rotation, said reliefs being constructed and arranged to snap-act on the pawls of the valve body.

2. A plate according to claim 1, wherein the housing and holding seats for the pawls have stop surfaces, which act on the pawls to fasten the plate to the valve body in a direction parallel to the valve stem.

3. A plate according to claim 1, wherein the plate comprises plastic material.

4. A plate according to claim 1, which can be coupled to a valve body having two counter-posed pawls, further comprising two corresponding passageways and counter-posed seats to fix the plate-valve at the two pawls.

5. A plate according to claim 1, further comprising means for being applied to the actuator before being mounted to the valve.

6. A plate according to claim 1, further comprising actuator-fastening means.

7. A plate according to claim 6, wherein said actuator-fastening means are snap-acting means.

* * * * *